INVENTORS
PETER G. VIDALIS
NICHOLAS J. PANOUSSIADIS.
BY
William F. Nickel
ATTORNEY INVENTORS
PETER G. VIDALIS
NICHOLAS J. PANOUSSIADIS.
BY
William F. Nickel
ATTORNEY INVENTORS
PETER G. VIDALIS
NICHOLAS J. PANOUSSIADIS.
BY
William F. Nickel
ATTORNEY Patented Apr. 22, 1952

2,594,254

UNITED STATES PATENT OFFICE 2,594,254

APPARATUS AND METHOD OF CLOSING AN ELECTRIC CIRCUIT BY MEANS OF A SECRET COMBINATION CHANGEABLE AT WILL

Peter G. Vidalis and Nicholas J. Panoussiadis, Athens, Greece

Application February 18, 1947, Serial No. 729,380
In Greece February 20, 1946

2 Claims. (Cl. 200—159)

The invention consists of improved apparatus and method which closes an electric circuit means of a combination secret and changeable at will. This is accomplished, for example, by operating a certain number of electric push buttons chosen in a group of such buttons, or by the manipulation of a certain number of electric interrupters chosen in a group of such interrupters, or by the introduction of plugs in a certain number of holes chosen in a group of such holes; the said plugs displacing electrical contacts and doing the same work as the buttons or interrupters; or by the displacement from chosen position of a certain number of multi-polar commutators. Or finally by the utilization of a disk similar or analogous to that employed in automatic telephones, and performing a function analogous to that of a multi-polar commutator.

The drawings show a number of embodiments of the invention but the invention is not limited to the forms actually shown. In practice changes may be made in many respects without deviating from the principle or essential character by which the invention is distinguished.

Figure 4:
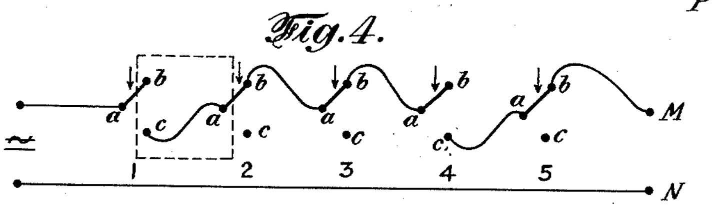
Figure 4 is a diagram of an electric circuit containing this switch.
Figure 5:
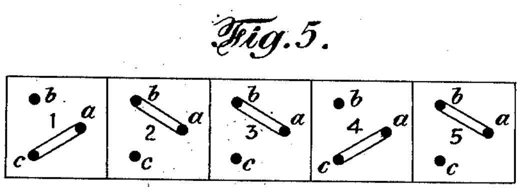

Figure 5 presents the panel for changing the secret combination in the case of the wiring of Fig. 4.

Figure 6:
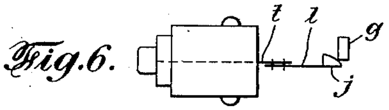

Figure 6 shows a self-stabilizing button-switch employed with the invention.

Figure 7:
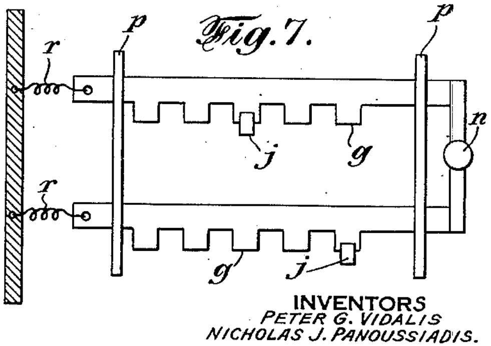

Figure 7 shows the manner of mounting said buttons and the mode of their operation.

Figure 8:
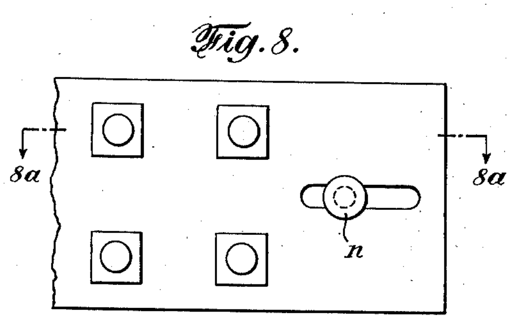
Figure 8A:
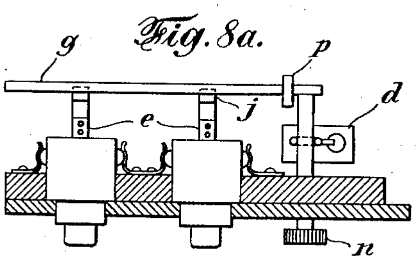

Figure 8 is a front view of a panel for carrying the parts indicated in Figures 6 and 7, and Figure 8*a* is a section on line 8*a*—8*a* in Figure 8.

Figure 9:
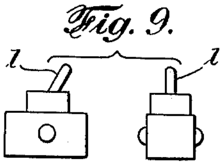

Figure 9 shows another type of circuit closing switch for the apparatus.

Figure 10:
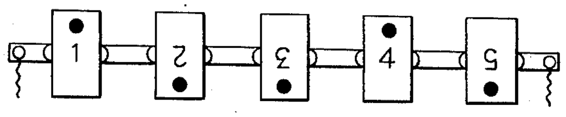

Figure 10 presents an arrangement of the circuit containing these circuit closing switches.

Figure 11:
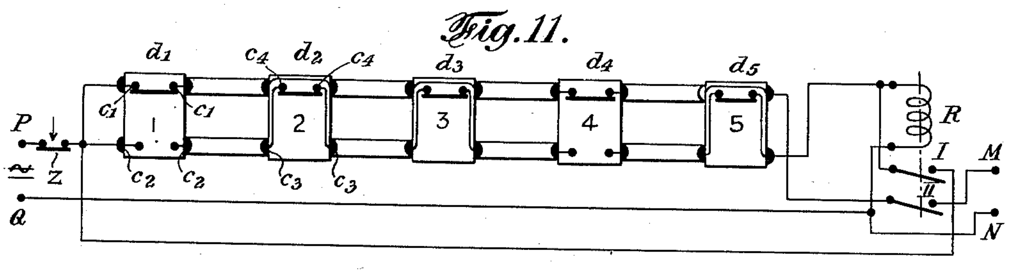

Figure 11 shows another arrangement of parts in our invention.

Figure 12:
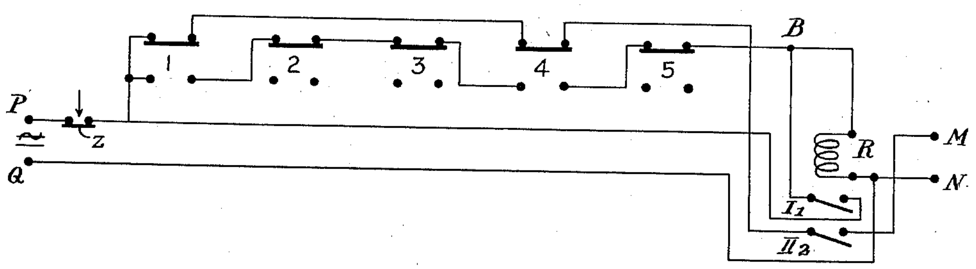

Figure 12 shows a similar arrangement with different component parts.

Figure 13:
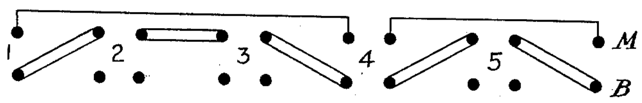

Figure 13 shows a diagram of altering the secret operating combination.

Figure 14:
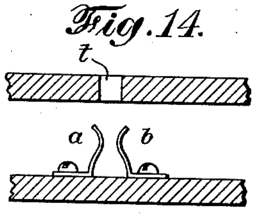
Figure 15:
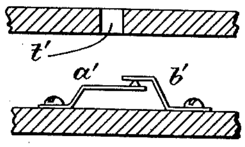
Figure 16:
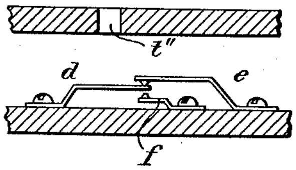

Figures 14, 15 and 16 present details of structure in the apparatus when plugs are used as manipulating members.

Figures 17, 17*a*, 17*b* and 18 show two additional ways of changing the key-combination.

Figures 17, 17A, 17B, 18, 19, 20:
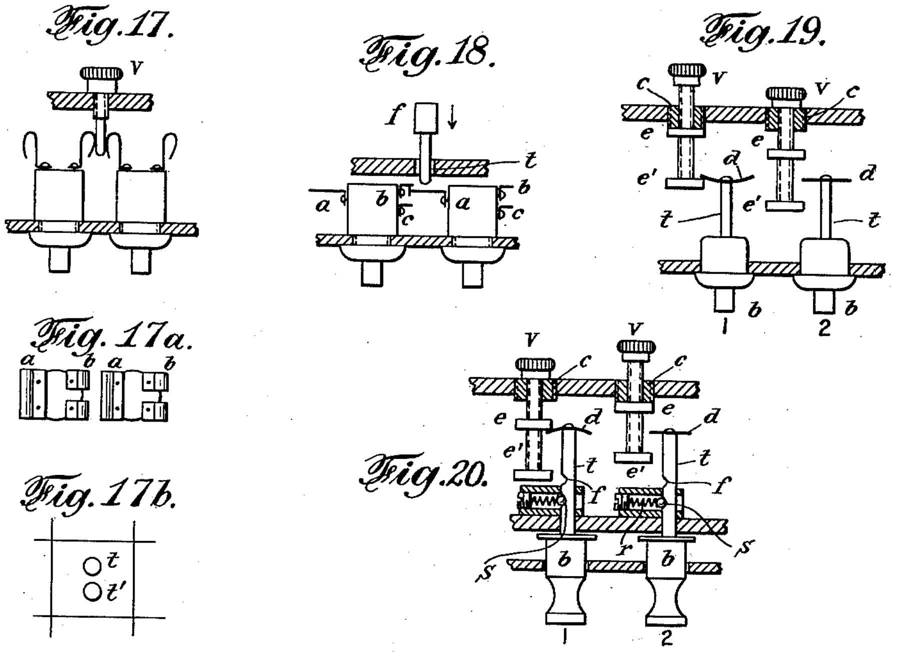

Figure 19 indicates another means for the same purpose in the using of push-buttons.

Figure 20 presents a modification of said means for using push-switches.

I. *Use of electrical buttons in series*

Figure 1:
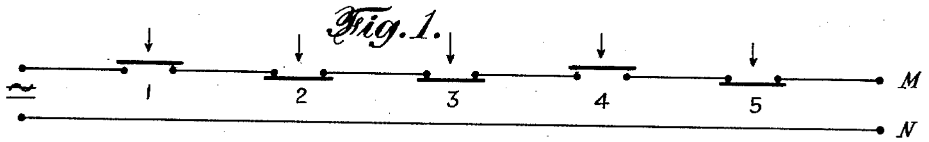
Figure 1 is a diagram showing the mode of operation of the apparatus.

1. Suppose that in the circuit of an electric apparatus connected to the binding posts M and N, Figure 1, one inserts a certain number of electric buttons or switch members in series, and that certain among these buttons, such as buttons 1 and 4 in Figure 1, are buttons for contact; that is to say, by pressing them they establish electric contact between their terminals; while the remainder among them, such as buttons 2, 3 and 5 in this figure, are buttons for interrupting; that is to say, by pressing them, they break or interrupt the connection already existing between their two terminals or contacts. If the outside appearance of the two kinds of buttons does not differ, it is indispensable that the operator should known the position of the buttons which have to be simultaneously pushed, so that the circuit is closed. The simultaneous pressing of all the buttons will clearly produce no result, because the contact is re-established for certain of the buttons, while it is broken for certain others.

That any person not knowing the position of the buttons which ought to be pushed, may succeed in closing the circuit, it is essential that he should try methodically, and as far as he could be favoured by chance, all the combinations possible of the buttons. It is clear that the total number of these combinations increases rapidly with the number of buttons.

2. In an arrangement of buttons so simple, the need presents itself, since the position of the buttons which ought to be pushed is known, to make a new group of the whole number of said buttons in such a fashion that the old secret combination of positions then known may be replaced by another which is unknown.

The new redivision of buttons presents some practical difficulties. For example, if the buttons are grouped upon a control panel screwed thereon, the new groupment will necessitate the unscrewing and rescrewing in another place of part of the buttons and the re-establishment of the connection of all the buttons in series.

Figure 2:
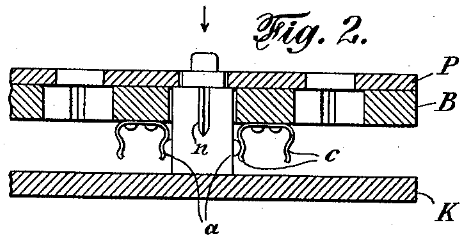
Figure 2 is a section and Figure 2*a* a top view of one construction for obtaining the result desired.
Figure 2A:
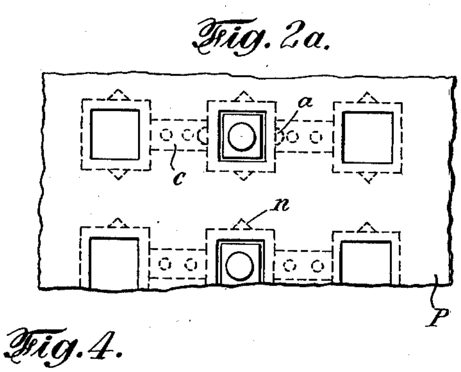

To simplify the operation of this new redivision, the buttons can be constructed in such a fashion that they can be placed by a simple pressure from the rear into seats or recesses of equal number in the control panel. One such arrangement is represented in Figures 2 and 2*a*. All these buttons, those for contact as well as those for interrupting, are alike on the exterior, presenting one distinctive mark; as for example, the colour, upon their rear faces. They have a square section and carry at the side two elongated fingers *n*. The control panel is double, consisting of an exterior metal plate P, with square holes, for the lodgment of the buttons, and an inside plate of insulating material B, for example of Bakelite, with the like square holes, and having the same centre, but at the side slightly larger than those of the holes of the metallic plate.

The plate B carries elongated cavities (or grooves) to receive the fingers *n*. Upon this plate B are screwed the electric contacts *c*, arranged in such a way that they put all the buttons in series. The terminals *a* of the buttons are placed by pressure into the seats for this action of the contacts *c*. The distinctive sign of each position of the button (letter of the alphabet, arithmetical figure, or any other symbol) is inscribed on the exterior of the metal plate and the interior of the Bakelite plate. When all the buttons are arranged at the desired places, the entire rear face of the system is closed by a cover K, which prevents the disconnection of the buttons by pressure from the front.

Figure 3:
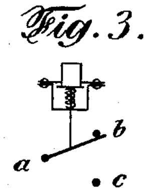
Figure 3 shows a reversing button-switch employed with the invention.

3. For the use of all possible combinations it is not necessary to change the position of the buttons. In the employment of special reverser buttons, one is able with a single kind of button to make use of any secret combination by the simple alteration of their electrical arrangement. One such reversible button is represented in Figure 3, where one sees that by the pushing of the button the electrical contact is broken between the two points *a* and *b*, and is established between the two points *a* and *c*. The electrical arrangement appears in the case where one makes use of the reverser buttons, as shown in Figure 4, where one sees that to make use of a reverser button as a button for contact, it suffices to connect the terminal *c* with the post *a* of the following button; while to employ such button for interrupting, it is necessary to connect the post *b* with the post *a* of the following button.

To facilitate the alteration of the secret combination, all the posts or terminals *a*, *b*, and *c* of the buttons are transferred to a panel of insulating material, Figure 5, placed behind the control panel. The posts *b* and *c* of each button and the post *a* of the following one are enclosed in a square, Figures 4 and 5, carrying the distinctive symbol of the first button, which symbol is inscribed upon the button itself or in proximity to it upon the control panel.

Figure 4 shows clearly that there is no need of transferring to the support or panel for the change of combination, the post *a* of the first button of the series arrangement; on the contrary, one has need of the post M after the last button. The adjustment for a given secret combination is made by connecting the respective posts of the insulating panel or tablet. In the instance of Figure 5, one has formed the secret combination 14. That is to say, one has to push simultaneously the buttons 1 and 4 to close the electric circuit. The panel of alteration of the secret combination can be hidden by a sliding plate, as in the foregoing system (Figure 2, plate K.).

4. The employment of electric buttons in series makes it necessary to push simultaneously all the buttons of contact.

This need on the one hand makes manipulation difficult, and on the other hand, it reduces the number of combinations because it restricts the number of buttons capable of being easily utilized in one combination. If, for example, we have a control panel with 24 buttons, theoretically the number of combinations would be great, as far as the simultaneous pressing of one to twenty-four buttons were possible. In practice the simultaneous pushing of more than 4 buttons is difficult; consequently the combinations are limited to a value far below the theory.

Moreover, as the test of each combination is done by the simple simultaneous pushing of the buttons, the time of the test of the possible combinations by a person not knowing the true combination is limited.

5. One way to obviate the inconvenience of the necessary simultaneous pushing is the stabilization, during the whole time of the setting of the secret combination, of each push button in pushed position. This stabilization is done in different ways, one of which is the following (Figure 6). The stem *t* of each button passes through its body and carries at the side opposite the head of the button a thin steel spring *l*, at the end of which is fixed a tongue or projection *j*. When the button is pressed, the tongue *j* comes to lie under an elongated strip or bar *g*, and prevents by its form the return of the button into the position of rest.

The strip *g* has the toothed form of Figure 7, and it can be moved in the direction of its length, by pulling it, because it slides in bronze bearings *p*, returning to its position of rest by the action of a spring *r*. By the pulling of the bar *g*, the tongues *j* come into notches of the bar *g*, and the buttons return into the position of rest.

The pulling of the bar *g* or of the group of bars *g*, if there are several lines of buttons, is done by hand by means of a movable handle or knob *n* in a groove of the control panel (Figures 8 and 8*a*).

In order that the movement of the knob *n* can be necessary, one can add an interrupter switch *d* open in the position of rest, which closes itself when the knob *n* is directed towards the right, and opens itself anew when it is returned towards the left. The interrupter *d* is in series with the controlled circuit and its closure should take place before the tongues *j* fall into the notches of the bars *g*.

This system, however, complicates mechanically the entire construction.

II. *Use of electric interrupters in series*

6. Another mode of neutralizing the simultaneous pressure is by the employment of interrupters in series in place of buttons in series. The interrupters utilized should be of such construction that one can see at first glance if they have been manipulated. Thus the employment of pusher interrupters is excluded. The interrupters which serve best are those of the rocking type. See Figure 9. As for the buttons, one can utilize either simple interrupters or reversers.

7. In the use of simple interrupters, one adopts the arrangement of Figure 1. On the control panel the interrupters should be placed in such a way that when the whole system is in the position of rest, that is to say when all the interrupters are closed except those involved in the secret combination (interrupters 1 and 4, Figure 1), levers 1 of all the interrupters should be in the same way (either all up or all down). Accordingly one places in one way the interrupters which ought to be closed in order to complete the circuit, and in the other way the remaining interrupters. The rear face of the interrupters should carry a distinctive sign in such a way that one will know to which position the lever of the interrupter is closed, and to which it is opened. Thus in the case of Figure 1, the interrupters will present an appearance from the rear analogous to that of Figure 10.

The alteration of the secret combination is made by the reversal of certain interrupters. Thus in the case of Figure 10, to replace the secret combination 14 by the secret combination 23, one should reverse the four interrupters 1, 2, 3 and 4. By the reversement of the interrupters 1 and 4, one suppresses the old secret combination, and by the reversal of interrupters 2 and 3, a new combination is adopted.

To facilitate the alteration of the secret combination the whole system can be constructed exactly like that represented by Figure 2, where it is a matter of buttons. The difference is that all the interrupters are alike, and one places them by pressure with the distinctive sign above or below, according to whether they are included or not in the secret combination.

8. The use of inverters does not involve any difference in the construction of the whole system, with the use of reverser buttons, even in the system for changing the secret combination.

9. The employment of interrupters presents the following disadvantages:

(*a*) After the adoption of the secret combination it is necessary to return to original position all the interrupters involved in the same. As this operation should be done after the performance of the desired work, there is danger that it may be forgotten.

(*b*) There is a possibility of repetition in the test of the different combinations, that is to say, that one can change the combination by the opening of one interrupter and closing of another. Thus if in one system of ten numbered interrupters we have formed the combination 12345, we can pass to the combination 12346 by two simple manipulations of the interrupters 5 and 6. This arrangement reduces the time of the test of the combinations.

10. The two above disadvantages can be removed by the addition of an electromagnetic relay as in Figure 11. Relay R consists of an electromagnetic coil which, when excited, attracts an armature closing by its movement the two interrupters I and II. The interrupters of the control panel are placed in their positions by pressure like the buttons of Figure 2. They have each four lateral contacts. In placing the interrupters, one creates two arrangements in series, one for the upper contacts, and one for the lower ones.

Use is made of two kinds of interrupters. Those comprised in the secret combination such as $d_1$ (Figure 11) are reversers. During their operation they connect between them at one time their contacts $c_1$ and at another time their contacts $c_2$. Those not involved in the secret combination $d_2$ (Figure 11) are simple interrupters. Their lower contacts $c_3$ are connected or disconnected between them by manipulation of the interrupter. On the contrary, their contacts $c_4$ are connected between them in a permanent manner, and serve for not interrupting the arrangement in series of the contacts $c_1$ of the reversers.

Figure 11 shows the electric arrangement of the system for secret combination 14. By manipulating interrupters 1 and 4, one supplies current to the coil of the relay R, while the manipulation of any other interrupter breaks the circuit of the coil in question. The relay R, excited, closes the interrupters I and II. The interrupter I stabilizes the relay in the position of operation, while the interrupter II is in the circuit of the apparatus-controlled—connected to the posts M and N—which circuit is only interrupted by the contacts $c_1$ of the reversers 1 and 4. To make the apparatus work, it is then necessary to return these reversers to their initial position. To make the relay return to the position of rest, it is indispensable that the operation of the apparatus produces interruption of current in the coil by the disconnection of the two contacts Z. This is easy in practice, as is explained farther on herein.

11. The addition of an electromagnetic relay to remove the disadvantages cited in Article 9 of this description serves the purpose equally in a system of reversers connected in permanent manner as indicated in Figure 12.

As one sees this, in Figure 12 as in Figure 13, which represents the panel of alteration of the secret combination in one such system, one puts in series with the coil of the relay R the upper contacts of the reversers not involved in the secret combination and the lower contacts of the reversers of the secret combination; and, in series with the controlled apparatus connected to the posts M and N, the upper contacts of the reversers of the secret combination. The lower contacts of the reversers not embraced in the secret combination remain free.

III. *Use of plugs*

12. In all instances of control by buttons or interrupters, one can replace these with contacts situated beneath the surface of the control panel, displaced by means of plugs introduced in holes in the panel, and performing by this movement a function identical to that of the buttons or interrupters thus replaced.

Thus in the case of Figure 14, a metal plug introduced into the hole *t* establishes electrical contact between the terminals *a* and *b*, and replaces a contact button or simple interrupter. In the same way, in the case of Figure 15, a plug of insulation introduced into the hole *t'* breaks the electrical contact existing between the posts *a'* and *b'* and replaces an interrupter button or simple interrupter. Finally, in the case of Figure 16, a plug of insulation introduced into the hole *t''* displaces the electrical contact of the terminal *d* from the terminal *e* to the terminal *f*, and also replaces a reverse button or simple reverser.

The employment of plugs presents the need that the operator should carry with him the number of plugs necessary for each case.

IV. *Remarks upon the above systems*

13. All the systems described up to this point give the important advantage of not requiring any electrical energy except those described in Sections 10 and 11, which use up during a minimum time the little energy absorbed by a magnetic relay or coil.

On the other hand, they present certain small disadvantages such as that they necessitate a finished construction to afford sure functioning because of the existence of several contacts in series.

Also, the number of possible combinations is small with reference to the number of controlling elements utilized (buttons, interrupters, or holes for the introduction of plugs), because the order of the manipulation of these parts does not play any role. Thus in the case of Figure 4, the desired action takes place either when one closes the interrupters in the order 1, 4, or when one closes these in the order 4, 1. Accordingly, so that one can have reasonable certainty, it is necessary to use a control panel relatively large, with many buttons or interrupters, or holes for the introduction of plugs. For example, in the case of the employment of a control panel with 24 buttons, of which one works with 4, the total number of combinations will be over 10,000, which presents security enough. Similarly in the case of the employment of a control panel with 16 interrupters, of which it is necessary to manipulate 6, the total number of combinations is over 8,000, which likewise presents enough security—all the more, since the time of the formation of each combination is greater than in the case of the buttons (principally in the systems described in Sections 10 and 11), and there is need of making the interrupters return to their initial position. We must also consider that a person ignorant of the secret, who tries to make use of the system, does not know the number of interrupters comprised in the secret combination.

V. *Use of electromagnetic relays*

14. By the addition of electromagnetic relays it is possible to establish an obligatory order of formation of the secret combination which considerably increases the security of the system. Thus if one employs 10 buttons of which it is necessary to press 5 in an order determined, the total number of arrangements would be equal to over 30,000.

ADDENDA

With reference to the apparatus described above in Section 3, Figures 17, 17*a*, 17*b* and 18 present two other methods of changing the key combination with the employment of reverser buttons. In the case of Figures 17, 17*a* and 17*b* the tablet or panel for altering the key combination allows for each button two screw holes *t* and *t'* and a metallic screw *v*. When one puts the screw in the hole *t* one connects the contact *b* of the button with the contact *a* of the following button and the initial button should not be pressed. On the contrary, when the screw is put into the hole *t'* one connects the contact *c* of the button with the contact *a* of the button following and the initial button should be pressed. In the case of Figure 18 the tablet of alteration of the number key carries a single hole *t* for each button. The plug *f* can be introduced into this hole. The contact *b* of the button is connected in the position of rest with the contact *a* of the button following. In introducing the plug into the hole *t* one pushes the contact *a* and, interrupting its connection with the contact *b*, one connects it with the contact *c* of the button. In this case one has need of a number of plugs equal to the number of buttons which are to be pushed.

Further, in connection with the apparatus set forth in Paragraph 3, in place of employing reverser buttons it is possible to transform at will a contact button into an interrupter button or inversely by the displacement of its contacts. One such system is represented in Figure 19. The button *b* carries only a contact disk *d* fitted upon the end of its stem *t*. To each button corresponds a stem *v* disposed upon the panel of alteration of the key combination and shifting itself into a nut *c* set into this panel. The stem *v* carries soldered upon its stem two collars or nuts *e* and *e'* and has two extreme positions limited on the one side by its head and on the other by the nut *e*. When the button *b* is in the position of rest and the stem *v* is in extreme position of withdrawal (button 1 of Figure 19), the nut *e'* contacts the disk *d*. If one takes as poles of the button at one side the nut *c* of the stem and at the other side the stem *t* of the button, the pressing of the button breaks the contact between its poles and the button plays the part of a button for interruption. On the contrary, if the stem *v* is in the extreme advanced position (button 2 of Figure 19), in the position of rest of the button, the disk or element *d* does not contact it at all. However, by lifting the button one moves the disk into contact with the nut *e* which now finds itself in closed proximity. The button *e* now plays the role of a button contact. The distance between the nuts *e* and *e'* should be about double the course of the disk.

Referring to the construction described above in Section 5 one notes that the simultaneous pressing is neutralized equally by a variation of the system described in the paragraph immediately preceding this one. This modification is represented in Figure 20. In this case the stem *t*, instead of being in one piece with a push button, can assume two stable positions of rest corresponding to the extreme positions of the disk *d*. This is attained by means of any appropriate arrangement, as for example that of Figure 20, where the stem or member *t* carries two notches *f* and *f'* of which the spacing is equal to the course of the disk *d*. A spring *r* presses a ball *s* into one or the other of the notches. Thus the stem can take two positions of rest corresponding to the extreme points of travel of the disk. To make the manipulation most practical, the arrangement of Figure 20 is the reverse of that of Figure 36. The stem *v* ought to be retracted when the corresponding button is employed as a button for interruption (button 1 of Figure 20) and pushed down when the button is employed as a button of contact (button 2 of Figure 20). Control is given by pulling the heads of the buttons of contact. After operation one should return the buttons to the position of rest by simple pressure.

In connection with the apparatus described above in Section 8 it is also to be noted that in the usage of reverse interrupters one can likewise use the systems of alteration of key combination represented by Figures 17, 17*a*, 17*b* and 18.

Having described the invention, what we believe to be new is:

1. Apparatus for controlling an electric circuit having switches in proximity to one another, each switch comprising an elongated longitudinally movable member of conductive material, means for supporting same, a contact element on said member, a catch mounted on said means, said member having notches engaged by the catch to be held in one of two positions of adjustment, an elongated longitudinally movable conductor stem adjacent said member and having contact collars thereon flanking said element, and a head on said stem, and means for supporting said stem between said head and said collars, the range of movement of stem and of the adjustment of the member being such that in one position of said member and said stem, the element will engage one collar and movement of either the stem or the member will disengage the element and the collar; and in another position of the stem and member the element will be between said collars and movement of either the stem or the member will cause the element to make contact with one of said collars.

2. Apparatus of the kind described comprising switches, each of which has a movable terminal and at least one fixed terminal, an electric circuit having conductors by which said switches are connected in series, some of said movable terminals being disposed in closed position and others in open position, an actuating member for each movable terminal, supporting means for said terminals and said members, said means concealing said conductors and the manner of uniting said conductors to said terminals, but exposing said members at least partly, said members being mounted in said supporting means, and said means being so shaped that each member can be moved in one direction only, said means being further so shaped that each member will be stopped at the end of such movement from its aforesaid position, so that operation of only such movable terminals as are in open position will effect completion of said circuit.

PETER G. VIDALIS.
NICHOLAS J. PANOUSSIADIS.

REFERENCES CITED

The following references are of record in the file of this patent:

UNITED STATES PATENTS

| Number | Name | Date |
|---|---|---|
| Re. 17,797 | Chase | Sept. 16, 1930 |
| 516,478 | Donnelly | Mar. 13, 1894 |
| 1,138,224 | Kaisling | May 4, 1915 |
| 1,283,845 | Marchant | Nov. 5, 1918 |
| 1,298,177 | Chrisman | Mar. 25, 1919 |
| 1,306,852 | Klein | June 17, 1919 |
| 1,433,543 | Garrison | Oct. 31, 1922 |
| 1,724,792 | Chase | Aug. 13, 1929 |
| 1,725,086 | Larson | Aug. 20, 1929 |
| 1,852,711 | Cutter | Apr. 5, 1932 |
| 1,905,965 | Leschke | Apr. 25, 1933 |
| 1,923,968 | Chase | Aug. 22, 1933 |
| 2,059,919 | Teubner | Nov. 3, 1936 |
| 2,197,802 | James | Apr. 23, 1940 |
| 2,436,809 | Joel | Mar. 2, 1948 |

FOREIGN PATENTS

| Number | Country | Date |
|---|---|---|
| 564,097 | Germany | Nov. 14, 1932 |